United States Patent [19]

Tipley

[11] Patent Number: 5,533,204
[45] Date of Patent: Jul. 2, 1996

[54] SPLIT TRANSACTION PROTOCOL FOR THE PERIPHERAL COMPONENT INTERCONNECT BUS

[75] Inventor: Roger E. Tipley, Houston, Tex.

[73] Assignee: Compaq Computer Corporation, Houston, Tex.

[21] Appl. No.: 229,233

[22] Filed: Apr. 18, 1994

[51] Int. Cl.⁶ .............................. G06F 13/36; G06F 13/00
[52] U.S. Cl. .................... 395/288; 395/200.05; 395/288; 395/290
[58] Field of Search ..................... 395/325, 550, 395/275, 288, 290, 550, 275, 200.05, 292, 285

[56] References Cited

U.S. PATENT DOCUMENTS

| | | | |
|---|---|---|---|
| 4,257,095 | 3/1981 | Nadir | 393/299 |
| 4,755,938 | 7/1988 | Takahashi et al. | 395/729 |
| 4,858,173 | 8/1989 | Stewart et al. | 395/732 |
| 5,045,998 | 9/1991 | Begun et al. | 395/307 |
| 5,067,071 | 11/1991 | Schanin et al. | 395/293 |
| 5,127,089 | 6/1992 | Gay et al. | 395/288 |
| 5,170,481 | 12/1992 | Begun et al. | 395/726 |
| 5,253,347 | 10/1993 | Bagnoli et al. | 395/325 |
| 5,333,276 | 7/1994 | Solari | 395/325 |
| 5,345,562 | 9/1994 | Chen | 395/275 |
| 5,353,415 | 10/1994 | Wolford et al. | 395/325 |
| 5,353,416 | 10/1994 | Olsen | 395/325 |
| 5,404,464 | 4/1995 | Bennett | 395/325 |
| 5,416,910 | 5/1995 | Moyer et al. | 395/325 |

FOREIGN PATENT DOCUMENTS

WO88/02150  3/1988  WIPO.

OTHER PUBLICATIONS

Peripheral Component Interconnect (PCI) Revision 1.0 Jun. 22, 1992 PCI Special Intrest Group c/o Intel Corporation.

PCI Local Bus Specification, Production Version, Revision 2.0, Apr. 30, 1993.

Primary Examiner—Jack B. Harvey
Assistant Examiner—Paul R. Myers
Attorney, Agent, or Firm—Pravel, Hewitt, Kimball & Krieger

[57] ABSTRACT

A computer system including the peripheral component interconnect (PCI) bus, including the LOCK# and STOP# signals and also having an extra sideband signal for supporting posted read transactions. The extra sideband signal, referred to as POST#, is used in conjunction with the LOCK# and STOP# signals defined in the PCI specification to implement the posted read. A posting target that determines that its read cycle is a long latency read, where the PCI bus should be released for non-exclusive accesses in the interim, asserts the STOP# and POST# signals to disconnect or retry the master and initiate a posted read. The master asserts the LOCK# signal in response to lock the posted target for the posted read, and then rearbitrates the PCI bus to other masters. Other masters may then access the PCI bus and perform non-exclusion access in the interim, while the posted target fetches the requested data. Masters requiring locked cycles or access to the posted target are disconnected or retried, or the cycle is otherwise aborted. Eventually, the original posting master regains control of the PCI bus, re-asserts the locked access and retrieves the data from the posted target.

6 Claims, 5 Drawing Sheets

SPLIT TRANSACTION PROTOCOL FOR THE PERIPHERAL COMPONENT INTERCONNECT BUS

BACKGROUND OF THE INVENTION

1. Field of the Invention

The present invention relates to a split transaction protocol for the Peripheral Component Interconnect bus using only one sideband signal.

2. Description of the Related Art

In many computer systems to date, a processor bus connects the processor to memory and usually to a second level (L2) cache to comprise a central processing unit (CPU) subsystem. The processor bus interfaces with input-output (I/O) device, such as a disk controller, CD-ROM, video and graphics cards, local area networks (LANs), to name a few, through an expansion bus, such as an Extended Industry Standard Architecture (EISA), Industry Standard Architecture (ISA), or MicroChannel bus. In spite of the high processor speeds, system performance is often limited by the speed of the much slower I/O devices because of the speed at which the processor can transmit or receive data to and from those devices.

To improve data flow and to better utilize the high clock rates of the newer processors, developers have turned to the local bus. A local bus resides logically between the processor bus and the expansion bus, connecting the buses through bridge circuitry. A number of standards have been developed, including VESA's (Video Equipment Standard Association) VL-Bus, Intel Corporation's PCI (Peripheral Component Interconnect), and Apple Computer Company's QuickRing. For example, with a PCI bus, the CPU subsystem interfaces with the PCI bus through a PCI bridge. Also often directly connected to PCI bus are audio, video, graphics, SCSI, and LAN subsystems. Further, an expansion bus chip set forms the bridge circuitry connecting the PCI bus to the standard expansion bus.

The PCI bus is a physical interconnect mechanism intended for use between highly integrated peripheral controller components and processor/memory systems. The intent was originally to standardize a local bus on which a large variety of input/output (I/O) components can directly connect together without glue logic. Further, the PCI bus was intended as a standard interface at the component level in much the same way that ISA, EISA or Micro Channel is a standard interface at the board level. PCI was not intended to replace standard expansion buses, which have, so far, remained the primary means of adding expansion boards when necessary. Nonetheless, the currently implemented version includes PCI connectors for receiving PCI compatible boards. Many of the I/O functions traditionally coupled through the expansion bus have migrated or will soon migrate to the PCI bus.

In discussing PCI, a few conventions will be observed. A signal name in all capital letters indicates a defined bus signal. For example, CLK and AD[31..00], respectively, represent the PCI clock signal and the 32 PCI address-data signals. These signals are physically asserted active high. The PCI specification defines some signals as active low following the special signal type definitions of PCI. These signals' physical lines are indicated in their negated state by being followed by a pound (#) sign. For example, when two PCI defined signals FRAME# and DEVSEL# go low, the signals are considered asserted initiating a frame and a device select, respectively. These conventions are consistent with the description of PCI found in the Peripheral Component Interconnect (PCI) Revision 2.0 Specification, Production Version, Revision 2.0, Apr. 30, 1993, ©1993 PCI Special Interest Group, which is hereby incorporated by reference.

According to the PCI specification, PCI provides an exclusive access mechanism, which allows non-exclusive accesses to proceed in the face of exclusive accesses. This is referred to as a resource lock. This allows subsequent PCI bus masters to hold a resource lock on a slave or target device across several instructions or accesses without interfering with non-exclusive, real time data transfers, such as video. A hardware lock is indicated by a signal referred to as LOCK#, which indicates an atomic operation that may require multiple transactions to occur. Therefore, in a resource lock, exclusivity of an access is guaranteed by the target device and not by excluding all other masters or agents from accessing the PCI bus.

According to the current PCI specification, if a PCI master performs a read to a target device which requires a substantial amount of time to complete the read cycle, the PCI bus is dedicated to that access until the data is returned. In the interim, the PCI bus is essentially idle. The target device could assert a disconnect or retry to indicate to the master that it is unable to perform the read within the latency requirements of the PCI bus. However, if no other devices require the bus, thrashing of the master-target might occur where the master keeps interrupting the target on several subsequent transactions until the data is finally available. Also, the master is unable to distinguish the normal disconnect or retry where the target is unable to perform the operation, from the long latency case where the operation simply takes more time. Locking the device is not desirable for just any case, since the device may be performing other transactions, such as an EISA bus master, and thus may simply be unable to handle the request at that time. Locking the target in that case may cause a fatal error.

When a target device is locked, and another master attempts to access that target, the currently locked target will respond by asserting a retry or disconnect transaction to prevent the access. Furthermore, the LOCK# signal is normally supposed to be released if a retry is signaled before a data phase has completed. Therefore, there are no mechanisms for allowing the master to release the bus for other non-exclusive accesses during a read to a long latency device, so that all other devices must wait while the bus is essentially idle.

It is desired to provide a mechanism to allow non-exclusive accesses to proceed during a read to a long latency device.

SUMMARY OF THE PRESENT INVENTION

In a computer system implemented according to the present invention, an extra "sideband" signal is included for implementing a posted read to a long latency device, otherwise referred to as a split transaction, so that other, non-conflicting accesses may be performed on the PCI bus. The present PCI specification leaves open the opportunity for product specific function/performance enhancements via sideband signals. A sideband signal is loosely defined as any signal not part of the PCI specification that connects two or more PCI compliant agents, and has meaning only to those two agents. In the current scheme, the STOP# signal is used as either a disconnect or retry mechanism. The STOP# signal may be asserted during a normal cycle or at any point in a burst cycle to stop the current cycle and retry it from that point in a later access. The PCI slave, generally referred to as a resource or a target of the access, asserts the STOP# signal when it is unable to satisfy the present request, or is otherwise busy performing other duties.

The new sideband signal, referred to as POST#, is used in conjunction with the presently defined LOCK# and STOP# signals for the PCI bus to implement the split transaction capability. The split transaction capability according to the present invention may be implemented by all or any subset of the devices coupled to the PCI bus. Traditional devices not supporting posted reads are not affected and need not be aware of the sideband POST# signal.

Recall that a PCI bus master may assert the LOCK# signal to lock a PCI target, so that the locked target may not be accessed by other masters until the LOCK# signal is removed. If an exclusive access is initiated by a bus master and the posting target "knows" that the access will require a long latency read operation, the target may activate the STOP# and POST# signals to initiate a posted read. This is the first portion of a split transaction. The master, if it supports split transactions according to the present invention, detects the POST# and STOP# signals asserted indicating that the read is to be posted. The PCI posting master then asserts the LOCK# signal to lock the posting target and rearbitrates the PCI bus to allow other non-exclusive accesses to occur. Although this late assertion of the LOCK# signal otherwise violates the PCI specification, this use is understood between posting devices and does not conflict with other devices, so that compatibility is maintained.

The posting target expects the LOCK# asserted and monitors it during the posted read. If the LOCK# signal is not asserted by the master in response to the POST# signal, the target knows that the master does not support posting. The target may then ignore the request, but preferably latches the address and performs the posted read anyway in case the aborted master subsequently tries to read the same address again. Once the data is retrieved, the posting target compares new addresses with the posted read address, and provides the data immediately if a match occurs. However, if the posting target is accessed again and the addressed do not match, the posted data may be lost. The posting target will abort the posted read if the LOCK# signal is negated, indicating that the posting master no longer needs the data.

If the LOCK# signal is asserted in response to the assertion of the POST# signal, the posted read is commenced and the target retrieves the requested data. Another master gaining access to the PCI bus during the posted read may not perform locked cycles. If it attempts to do so, it will be retried and the access will be aborted. This is also true for read posting, so that another post operation is not allowed while one post operation is in progress. Any masters attempting to access the locked target will also be aborted, since that device is busy handling the posted read. Eventually, the original posting master regains access to the PCI bus and accesses the posting device to retrieve the requested data. The posting master indicates it is the original master by negating and reasserting the LOCK# signal during the address phase, to re-assert the lock cycle according to the PCI specification.

Since the target performing the posted read is locked, only non-exclusive accesses are allowed in the interim. Typically, the main memory controller would receive most of the non-exclusive accesses during the posted read, since it is not usually a long latency device. In this manner, significant time savings are achieved since the PCI bus is freed to perform other task during long latency read cycles.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
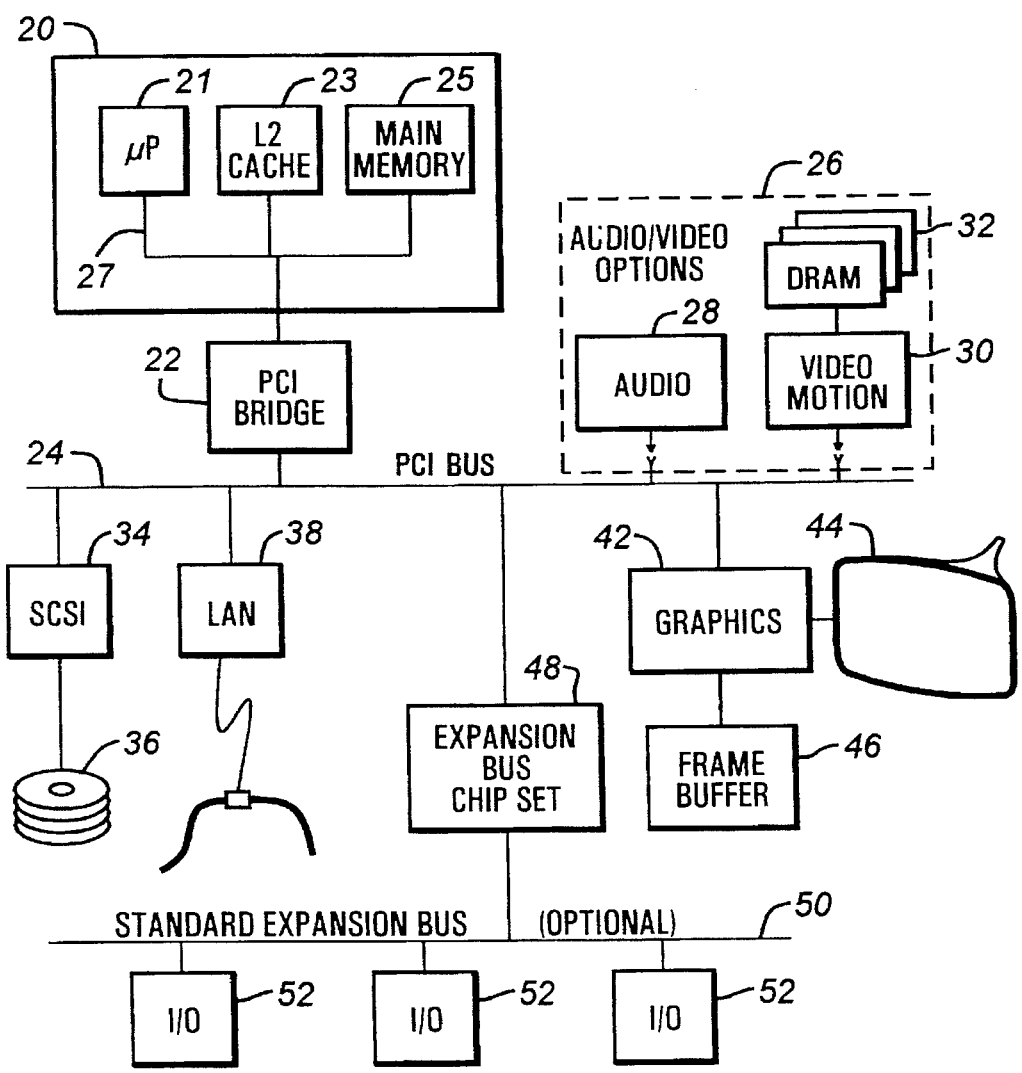
FIG. 1 shows a block diagram of a prior art computer system in which the present invention can be incorporated, including a CPU subsystem, a standard expansion bus and a peripheral component interconnect (PCI) local bus.

Referring now to FIG. 1, a block diagram of a computer system according to the present invention is shown, including a CPU subsystem 20, a standard expansion bus 50 and a PCI local bus. The system shown in FIG. 1 is only one example of a computer system using a PCI bus implemented according to the present invention, although many other configurations are possible. The CPU subsystem 20 is connected to a PCI bridge 22, which is further connected to a PCI bus 24. The PCI bridge 22 provides a low latency path through which the CPU subsystem 20 may directly access PCI devices mapped anywhere in the memory or I/O address spaces. The PCI bridge 22 also provides a high bandwidth path allowing other PCI masters direct access to the main memory. As will be described more fully below, the PCI bridge 22 is implemented as a posting master device according to the present invention for purposes of illustration.

The CPU subsystem 20 preferably comprises a microprocessor 21, a second level (L2) cache 23 and a main memory 25, all connected through a common bus 27, which is, in turn, connected to the PCI bridge 22. The CPU subsystem 20 and processor bus 27 preferably operate at a clock frequency of 33 MHz or more. The PCI bus 24 preferably operates at a clock speed of between 20–33 MHz as defined by the PCI specification.

The PCI bus 24 includes a plurality of connectors, preferably up to five or six, for receiving individual components or board-level plug-in I/O functions. In FIG. 1, an audio/video (A/V) option card 26 is shown connected to the PCI bus 24, where the A/V card 26 includes a motion video 30 and an audio device 28 both connected to the PCI bus 24. Memory, such as dynamic random access memory (DRAM) 32, is connected to the motion video 30. In a similar manner, a SCSI disk controller 34 is connected to the PCI bus 24 and a plurality of hard disks 36 are connected to the PCI bus 24 through the SCSI controller 34. Also, a local area network (LAN) 38, such as the Ethernet or token-ring topology, for example, is connected to the PCI bus 24. A graphics card 42 is connected to the PCI bus 24, and a monitor 44 is connected to the graphics card 42, which includes a frame buffer 46 for holding data for the graphics card 42.

An expansion bus chip set (EBCS) 48 is connected to the PCI bus 24, and also to a standard expansion bus 50, which may be the Industry Standard Architecture (ISA) or the Extended ISA (EISA) bus, although the present invention is not limited to any particular type of expansion bus. The EBCS 48 preferably serves as a posting target which supports split transaction capability according to the present invention. Finally, several expansion bus I/O boards 52 are connected to the standard bus 50 as known to those skilled in the art. Although only one posting master and one posting slave is shown, being the PCI bridge 22 and EBCS 48, respectively, it is understood that all or any subset of the devices connected to the PCI bus 24 could support split transactions according to the present invention. This is due to the fact that for all intents and purposes, a split transaction capability according to the present invention is transparent to the basic PCI compatible devices and does not affect their operation.

The various components connected to the PCI bus 24 act as either masters or slaves or both. Typical combined masters and slaves on the PCI bus 24 are the CPU subsystem 20, the SCSI controller 34, the LAN 38 the A/V card 26 and the EBCS 48, with the graphics card 42 typically being just a slave. As will be described more fully below, a PCI master asserts its individual request signal and receives a corresponding grant signal from a PCI arbitrator (not shown). The PCI arbitrator may be a separate component on the PCI bus 24, or could be located within the PCI bridge 22 or the EBCS 48. Once a master receives its grant signal, it takes control of the PCI bus 24 when it is next available.

Figure 2A:
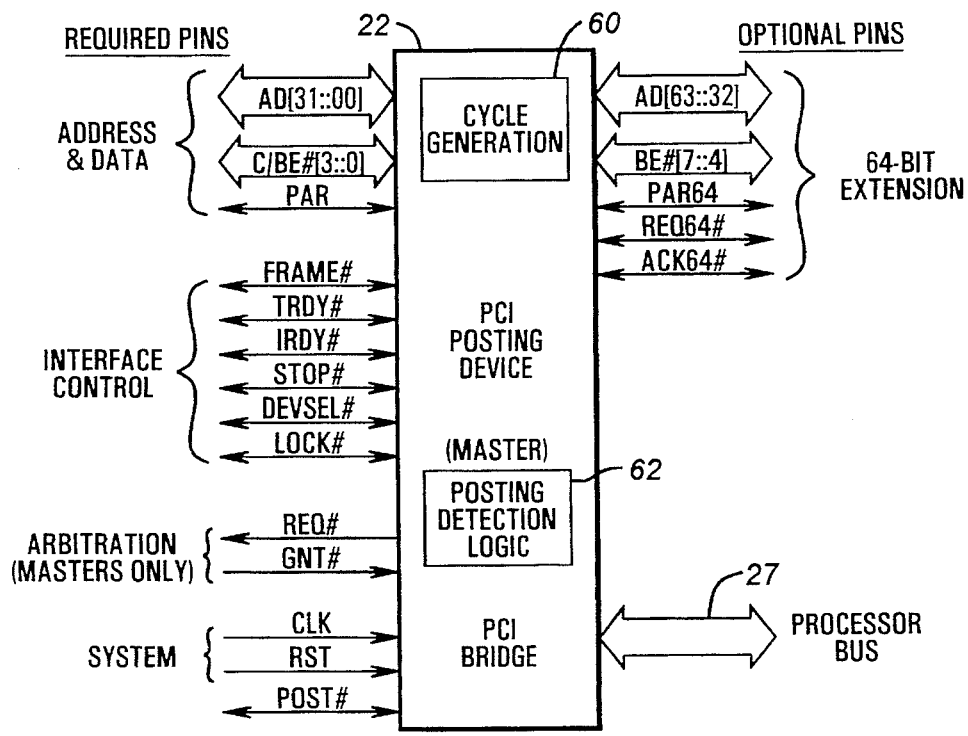
FIGS. 2A and 2B are block diagrams showing a PCI posting master and a posting target, respectively, according to the present invention.

Referring now to FIG. 2A, a single block diagram of several of the signals and pins of the PCI bridge 22 is shown, which includes the capability to perform posting read functions according to the present invention. The PCI bridge 22 includes the required signals and pins according to the PCI specification, and may include one or more of the optional signals depending upon the particular design of the computer system. The PCI bridge 22 also includes cycle generation logic 60 for executing read cycles on the PCI bus 24 and posting detection logic 62 for detecting the assertion of the STOP# and POST# signals during a read cycle and for asserting the LOCK# signal. Not all of the signals will be fully described, although those signals necessary for full disclosure of the present invention are described. The 32-bit address and data signals are multiplexed on the same PCI signals AD[31::0] for the 32-bit option, where these address/data signals are generally referred to as the AD signals. The 32-bit bus command and byte enable signals C/BE#[3::0] are multiplexed on the same PCI signals, which define the bus command during the address phase and the byte enables for the data phase of each transaction. A parity bit provides even parity across the AD and the C/BE# signals. For 64-bit transfers, optional data pins D[63::32], byte enables BE# [7::4], a 64-bit parity signal PAR64, a request signal REQ64# and acknowledge ACK64# signal would be included, although these additional signals are not necessary for purposes of the present invention.

Several interface control signals are defined for transactions between masters and slaves. It is noted that the PCI bridge 22 may act as a master or a slave device depending on the transaction. For purposes of the present invention, the PCI bridge 22 will serve as a master of the PCI bus 24 to allow the microprocessor 21 or the L2 cache 23 to retrieve data from the EBCS 48 in a posted read transaction, and to load the data into the main memory 25. Also, the SCSI controller 34 will act as a master and the PCI bridge 22 as the slave, so that the SCSI controller 34 can transfer data to main memory 25 during the posted read.

A cycle frame signal, referred to as FRAME#, is driven by the current master to indicate the beginning and duration of an access. When the FRAME# signal is negated, the transaction is in the final data phase. A target ready signal, referred to as TRDY#, indicates the current target device's ability to complete the current data phase of the transaction. An initiator ready signal, referred to as IRDY#, indicates the bus master's ability to complete the current data phase of the transaction. The TRDY# and IRDY# signals are used in conjunction, where a data phase is completed on any clock cycle where both the TRDY# and IRDY# signals are sampled asserted. During a read cycle, the TRDY# indicates that valid data is present on the AD signals and the IRDY# signal indicates the bus master is prepared to accept the data. During a write cycle, the TRDY# signal indicates the target device is prepared to accept data and the IRDY# signal indicates that valid data is present on the AD signals. Wait cycles are inserted until both IRDY# and TRDY# signals are asserted together.

A signal referred to as STOP# indicates that the current target is requesting the present bus master to stop the current transaction. A signal referred to LOCK# is typically used to indicate an atomic operation that may require multiple transactions to complete. A posting master according to the present invention uses the LOCK# signal to lock the posting target during a posted read to prevent other masters from interfering with the posted read transaction. However, non-exclusive transactions between other masters and targets may proceed. The LOCK# signal will be described more fully below.

A device select signal, referred to as DEVSEL#, indicates that a device has decoded the address asserted by a master on the AD signals as the target of the current access. As an input, the DEVSEL# signal indicates to the master whether any device on the PCI bus 24 has been selected. To implement arbitration on the PCI bus 24, PCI bus masters each include a request signal referred to as REQ# and a grant signal referred to as GNT#. A master asserts its REQ# signal to the arbitrator to request use of the PCI bus 24. This is a point-to-point signal, so that every bus master has its own REQ# signal. Correspondingly, each master receives its GNT# signal which is asserted by the arbitrator to the bus master to indicate that access to the PCI bus 24 has been granted. This is also a point-to-point signal so that every master has its own GNT# signal. Although there are a plurality of REQ# and GNT# signals, only one of each is generically referred to indicate the present master. The PCI posting master bridge 22 also includes an extra sideband signal, referred to as POST#, for implementing split transactions according to the present invention. Finally, system signals including CLK and RST are included. The CLK signal is the clock signal for the PCI bus 24, which is preferably a square wave operating between 20–33 MHz. The RST signal is asserted to reset the device as known to those skilled in the art.

Figure 2B:
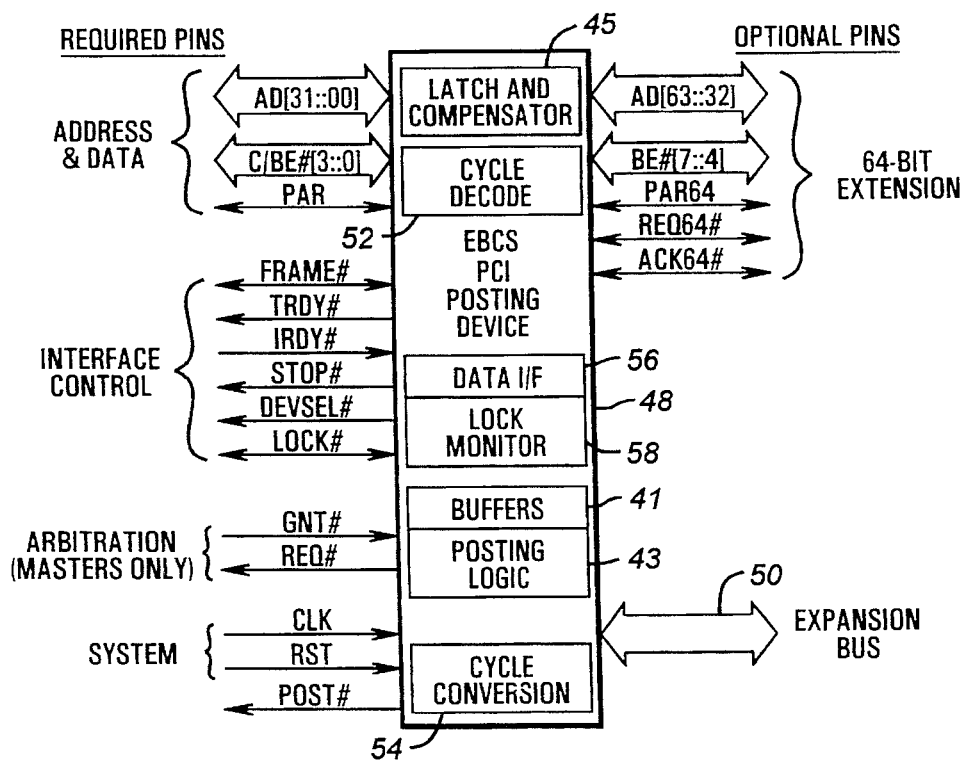

Referring now to FIG. 2B, a simple block diagram is shown of the signals and pins of the EBCS 48 according to the present invention for purposes of illustration. The EBCS 48 generally includes the same signals on the PCI bus 24 as the PCI posting master 22 since it acts as both a master and a slave. The EBCS 48 preferably includes data interface logic 56 for retrieving and providing data to the PCI bus 24 and buffers 41 for temporarily holding data for read and write operations, including data retrieved during a posted read. The EBCS 48 may be implemented to always post read transactions if all read transactions are long latency. As the EBCS 48 is attached to the slower expansion bus 50, this is the primary reason it is preferred to be a posting slave. The EBCS 48 includes cycle decode logic 52 for detecting read cycles from devices attached to the PCI bus 24 and monitoring logic 58 for monitoring the LOCK# signal. The EBCS 48 preferably includes posting logic 43, which determines whether the requested data is immediately available, such as already loaded in the buffers 41, or whether the data must be fetched requiring a posted read transaction. Cycle conversion logic 54 is coupled to the cycle decode logic 52 and the PCI bus 24 for asserting the STOP# and POST# signals to convert a read cycle into a posted read cycle. Also, although not required, the EBCS 48 preferably includes an address latch buffer and comparator circuit 45 for latching addresses and comparing the latched address to subsequent addresses appearing on the AD signals. The purpose for the latch and comparator circuit 45 will be described more fully below.

It is understood that any of the devices coupled to the PCI bus 24 could be implemented with posting target capabilities, including the SCSI controller 34, the LAN controller 38, the graphics card 42, or the A/V card 26, since any of these devices may require a significantly long period of time to complete a read by the current master. The EBCS 48 is used to demonstrate any of these devices performing a posted read. In the preferred embodiment, although the EBCS 48 is shown as performing posted target functions, it is also a PCI posting master. Thus, the EBCS 48 includes all of the signals shown in FIG. 2A of the PCI bridge 22, but also includes the buffers 41, the posting logic 43 and the address latch buffer and comparator circuit 45. For purposes of the present invention, the EBCS 48 provides data to be loaded into the main memory 25 upon request by the microprocessor 21 or the L2 cache 23, where the PCI bridge 22 serves as the master.

Figure 3B:
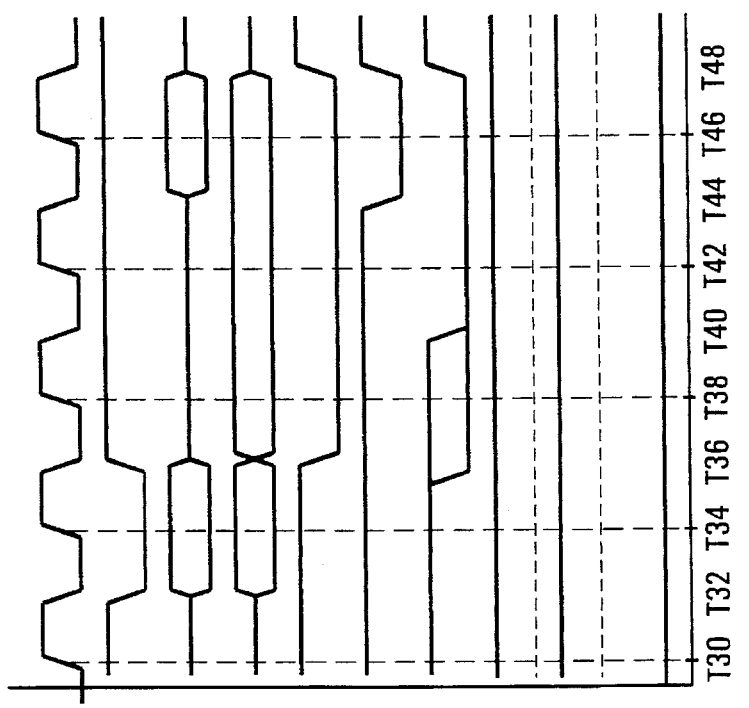
FIGS. 3A–3D show timing diagrams illustrating the initiation of a posted read cycle, a non-exclusive access by another master, a retried access by another master attempting to access the posted target, and the completion of the posted read cycle, respectively.
Figure 3A:
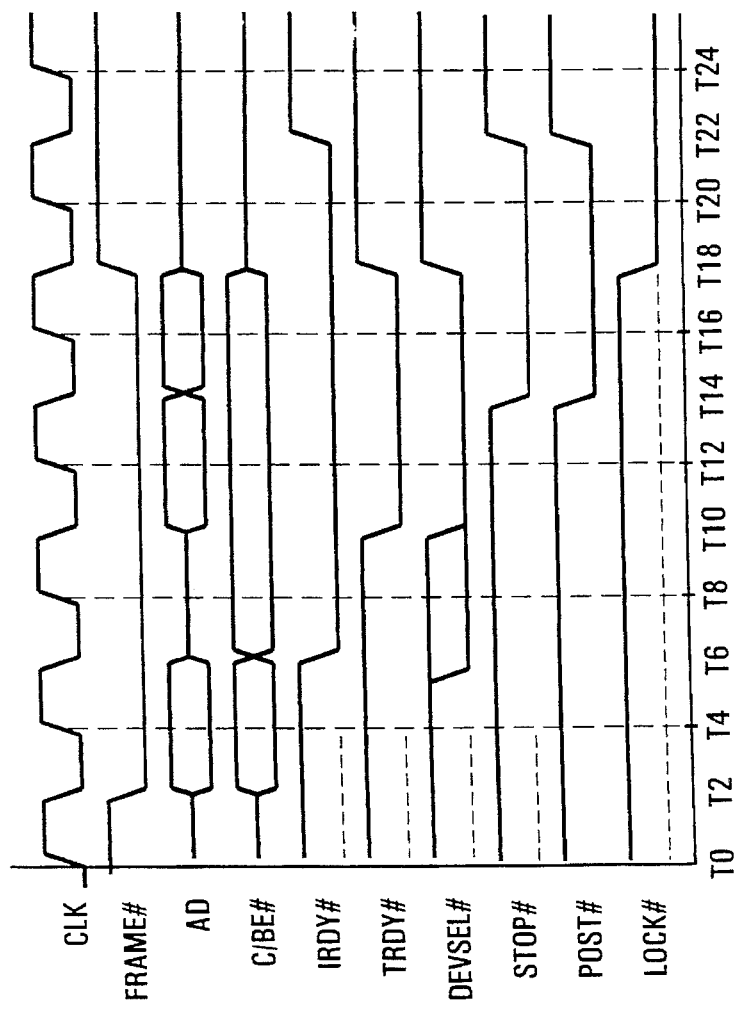

Referring now to FIGS. 3A–3D, a series of timing diagrams are shown illustrating the initiation of a posted read by the PCI bridge 22 to the EBCS 48, a non-exclusive transaction during the posted read, a blocked access by another master attempting to access the locked EBCS 48, and the completion of the posted read, respectively. The CLK cycle is shown first to indicate the synchronized timing of each of the transactions. Timing events are referred to in time by a number prefixed by the letter T, where the numbers representing sequential points of time are generally incremented by two after one-half CLK cycle has elapsed. In FIG. 3A, a first CLK cycle is initiated at a time T0 and the PCI bridge 22 asserts the FRAME# signal and asserts an address on the AD signals to begin the address phase one-half CLK cycle later at a time T2. The C/BE# signals are asserted by the PCI bridge 22 to indicate a read operation. Although all the signals defining the cycle are not shown, the read is a burst read where a single address phase is followed by multiple data phases. The address phase occurs at the initiation of the second CLK cycle at a time T4, while the FRAME# signal is asserted and the address is asserted on the AD signals. Since the LOCK# signal is not asserted during the address phase while the FRAME# signal is asserted, the present transaction is considered exclusive.

Subsequently, at a time T6 during the second CLK cycle, the AD signals are no longer driven and the IRDY# signal is asserted by the PCI bridge 22 indicating that it is ready to begin the first data phase. However, the TRDY# signal is not asserted at time T6 forcing a wait cycle, since the EBCS 48 is not ready for the data phase. At a time T8, the third CLK cycle begins where the data phase is initiated. During the third CLK cycle at a time T10, the EBCS 48 has decoded the address and asserts the DEVSEL# signal indicating that it is the selected device. Also, by this time, the EBCS 48 has determined that at least some of the data required for the bursted read is located within the buffers 41. Thus, the selected target EBCS 48 asserts the TRDY# signal and also places a first data set on the AD signals. Note that since the data set was readily available in the buffers 41, posting is not yet necessary. At a time T12, the fourth CLK cycle begins while the first data set is available, and the IRDY# and TRDY# signals are asserted simultaneously indicating that the current data phase is to be completed.

Subsequently, at a time T14 during the fourth CLK cycle, the EBCS 48 asserts a second set of data on the AD signals. However, the posting logic 43 detects at this time that more data is being requested by the burst, so that a long latency read will be required since it does not have the last data set readily available. An example of such an interrupted burst sequence is an EISA bus controller (within the EBCS 48), which performs line prefetches from an I/O device 52 on the expansion bus 50 (which would be an EISA bus in this example) in response to a read cycle by a PCI master to the I/O device 52. The prefetching function of retrieving subsequent lines of data in anticipation of future reads improves system performance.

If the EISA bus controller runs out of prefetched data in the middle of the burst cycle, where data located past the prefetched line boundary is required by the PCI master and is not located in the buffers 41, the EISA bus controller must interrupt the burst sequence with a disconnect or retry. An EISA bus controller implemented according to the present invention would thus post a read in the middle of the burst sequence. In most situations, however, the posted read would be a single read cycle. The interrupted burst cycle is shown and described for full disclosure.

Therefore, if the EBCS 48 always posts, or if the requested data is not readily available in the buffers 41 and the posting logic 43 indicates a posted read, the EBCS 48 asserts the STOP# and POST# signals at time T14 indicating a disconnect and posted read. Nonetheless, since the EBCS 48 is able to complete the current data phase, it keeps the TRDY# and DEVSEL# signals asserted. One half CLK cycle later, at a time T16, the PCI bridge 22 latches the second data set, but also detects the STOP# and POST# signals asserted. At a time T18, the PCI bridge 22 asserts the LOCK# signal in response to the POST# signal, and also negates the FRAME# signal in response to the STOP# signal. The EBCS 48 negates the TRDY# and DEVSEL# signals indicating it cannot complete another data cycle. At a time T20, the PCI bridge 22 detects the TRDY# signal negated indicating no more data transfers, and subsequently negates the IRDY# signal at a time T22. Also at time T22, the EBCS 48 negates the STOP# and POST# signals to complete the transaction. The EBCS 48 also detects the LOCK# signal asserted at time T20, so that it now begins performing the posted read.

In the interim period between the FIGS. 3A and 3B, an arbitration cycle occurs where the SCSI controller 34 is granted control of the PCI bus 24. Referring to FIG. 3B, the new cycle begins at a time T30 at the assertion of the CLK signal, and the SCSI controller 34 asserts the FRAME# signal low one-half CLK cycle later at a time T32. Since the LOCK# signal remains asserted, this is a non-exclusive access. The SCSI controller 34 asserts an address on the AD signals, and asserts the C/BE# signals indicating a read cycle. All potential targets, including the PCI bridge 22 and the EBCS 48, detect the address at a time T34 and begin decoding. At a time T36, the address is de-asserted, and the SCSI controller 34 asserts the IRDY# signal low indicating it is prepared to read data. Also, the SCSI controller 34 negates the FRAME# signal, so that only one data cycle is requested. At a time T38, decoding by the targets continues, and the PCI bridge 22 detects that the operation is a read of the main memory 25 by the SCSI controller 34. Thus, at a time T40, the PCI bridge 22 asserts the DEVSEL# signal low indicating it is the selected PCI target.

Since the PCI bridge 22 is unable to perform the read immediately and is retrieving the requested data from the main memory 25, it does not yet assert the TRDY# signal, forcing a wait state. Several wait states may occur at this time. Eventually, at a time T44, the PCI bridge 22 asserts the TRDY# signal and asserts data on the AD signals. At a time T46, the SCSI controller 34 retrieves the requested data, and the cycle is completed at a time T48 when the IRDY# signal is negated. Also, the PCI bride 22 negates the TRDY# and DEVSEL# signals at time T48. Note that the LOCK# signal remains asserted throughout the transaction, so that the EBCS 48 remains locked while performing its posted read.

Figure 3D:
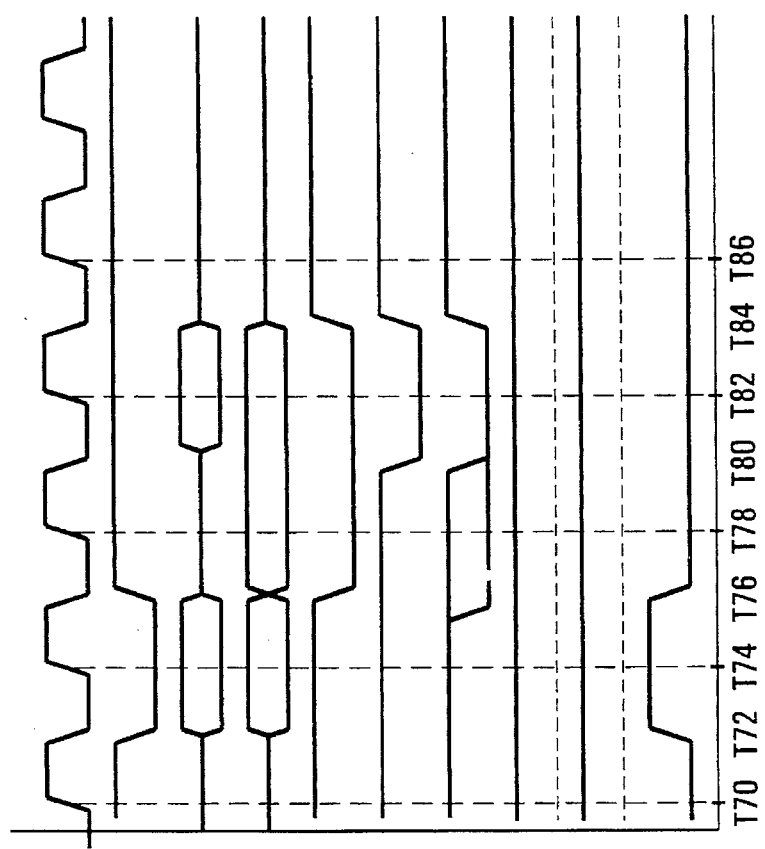
Figure 3C:
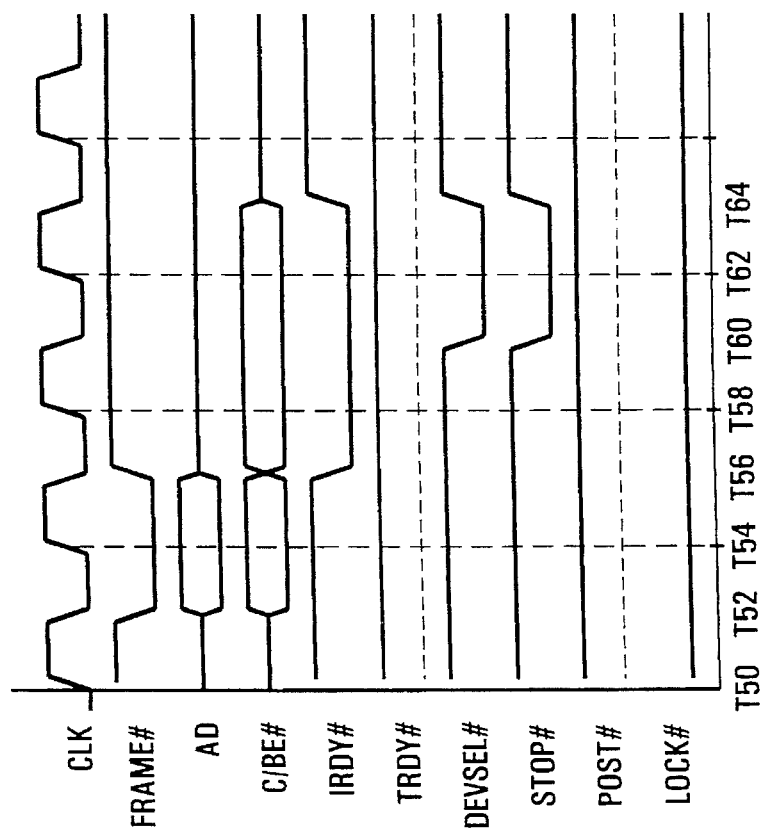

In the interim period between FIGS. 3B and 3C, another arbitration cycle occurs where the A/V card 26 is granted control of the PCI bus 22. Referring to FIG. 3C, the first CLK cycle begins at a time T50, where the FRAME# signal and a new address is asserted on the AD signals. It is noted that the LOCK# signal continues to be asserted by the PCI bridge 22 throughout the cycle, indicating that it retains control of the EBCS 48. The second CLK cycle begins at a time T54, where the address asserted on the AD signals is sampled by prospective target devices. During the second CLK cycle at a time T56, the A/V card 26 negates the FRAME# signal indicating a single data cycle, and also asserts the IRDY# signal low at time T56 indicating its readiness to begin the data phase. At a time T58, the third CLK cycle begins while the A/V card 26 is asserting the IRDY# signal. At a time T60 during the third CLK cycle, the locked target EBCS 48 decodes the address asserted at time T24 and asserts the DEVSEL# signal as well as the STOP# signal to indicate a retry to the A/V card 26. A retry is indicated by asserting the STOP# signal and keeping the TRDY# signal negated, since the EBCS 48 is locked by the PCI bridge 22. No data transfer occurs. The fourth CLK cycle begins at a time T62, where the A/V card 26 detects the STOP# signal asserted and the TRDY# signal negated, so that the entire cycle is subsequently terminated at a time T64. The IRDY#, STOP# and DEVSEL# signals are negated by the A/V card 26 and the EBCS 48 at time T64.

Arbitration again occurs during the time indicated between FIGS. 3C and 3D, where the PCI bridge 22 regains control of the PCI bus 24. Referring now to FIG. 3D, a new cycle begins at time T70 during a first CLK cycle, where the FRAME# signal is asserted and an address is asserted on the AD signals at a time T72. It is noted that the address is not necessarily required since the burst cycle is intended to finish up where it left off. However, since other devices are performing decode at this time, the asserted address assures that another device does not mistakenly get addressed and attempt the cycle. The PCI bridge 22 negates the LOCK# signal while the FRAME# signal is asserted to indicate a continuing exclusive access. Thus, when the PCI bridge 22, as original master, is granted access to the PCI bus 24, it starts another exclusive access to the original target EBCS 48 that it previously locked. The FRAME# signal is detected asserted and the LOCK# signal is detected negated at a time T74, where the prospective target devices latch in the address asserted on the AD signals and begin decoding. During the second CLK cycle at a time T76, the FRAME# signal is deasserted to indicate the last data phase of the retried burst sequence, and the LOCK# signal is again asserted by the PCI bridge 22 to reestablish the lock. The PCI bridge releases the address signals and asserts the IRDY# signal indicating that it is ready for the data phase.

The third CLK cycle begins at a time T78, and during the third CLK cycle at a time T80 the locked target EBCS 48 accepts and responds to the request by asserting the DEVSEL# and TRDY# signals, and provides the final data set on the AD signals. The data is detected by the PCI bridge 22 at a time T82 at the beginning of the fourth CLK cycle, while the TRDY# and IRDY# signals are asserted. At a time T84, the cycle is completed, so that the PCI bridge 22 negates the IRDY# signal and the EBCS 48 negates the TRDY# and the DEVSEL# signals indicating the end of the data cycle.

It is noted that at time T84, the PCI bridge 22 takes one of two actions with respect to the locked EBCS 48 as indicated by two possible states of the LOCK# signal. If the PCI bridge 22 determines that it has completed its exclusive access, it negates the LOCK# signal to release the locked EBCS 48 for access by other bus masters. Otherwise, if the PCI bridge 22 requires continued exclusive access of the locked EBCS 48, it keeps the LOCK# signal asserted.

Referring back to FIG. 3A, it is noted that if the LOCK# signal is not detected asserted by the EBCS 48 at time T20, then the master requesting the data does not support split transactions according to the present invention. Nonetheless, the master is forced to disconnect since the EBCS 48 asserted the STOP# signal. If the latch and comparator circuit 45 is provided in the EBCS 48, it latches the address at time T4 and the target attempts to perform the read anyway. However, exclusive accesses may occur in the interim possibly even to the EBCS 48, since the LOCK# signal is not asserted. This may result in loss of the posted data. If the data is retrieved without interruption and if the original master again attempts the access, the EBCS 48 provides the retrieved data if the latched address is the same as the new address.

Figure 4B:
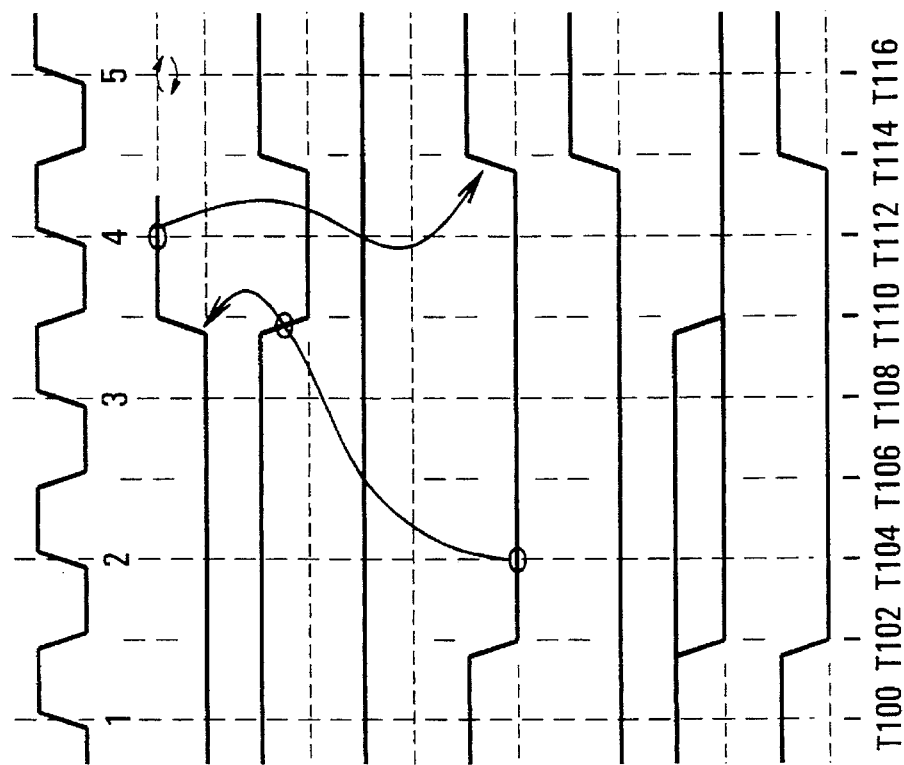
FIGS. 4A and 4B show timing diagrams illustrating other variations of a posting target initiated termination and posted read according to the present invention.
Figure 4A:
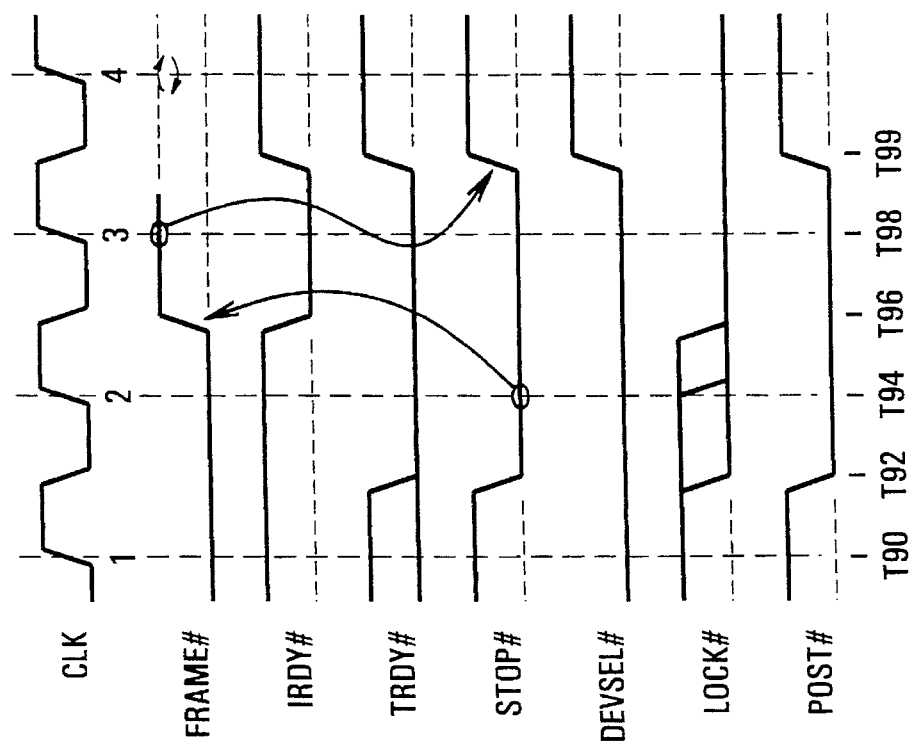

Referring now to FIGS. 4A and 4B, two timing diagrams are shown illustrating a couple of different target initiated terminations and posted read operations according to the present invention. The EBCS 48 posting target determines whether or not data is transferred after the STOP# signal is asserted. Data transfer takes place on every cycle where both the IRDY# and the TRDY# signals are asserted, independent of the state of the STOP# signal. If the EBCS 48 can, it performs one more data transfers before terminating by asserting the TRDY# and STOP# signals at the same time as was shown in FIG. 3A. FIG. 4A shows a slightly different disconnect situation, where data is transferred after the STOP# signal is asserted. The EBCS 48 declares its intent to do another data transfer by having the TRDY# signal asserted at the time the STOP# signal is asserted. The timing diagram shown in FIG. 4B illustrates the case in which data is not transferred at all after the STOP# signal is asserted because the TRDY# signal is deasserted. This is an example of a retry transaction, which is a special case of the disconnect.

Referring now to FIG. 4A, a time T90 indicates a current transaction in progress while the FRAME# signal is asserted by the a posting master, such as the PCI bridge 22. The master is not ready for data transfer, as indicated by the IRDY# signal negated at time T90. Also, the target has already been selected as indicated by the DEVSEL# signal asserted. Subsequently, at a time T92 during the first CLK cycle, the target indicates a disconnect by asserting the TRDY# and STOP# signals simultaneously. Furthermore, the target indicates a posted read by asserting the POST# signal at time T92 concurrently with the assertion of the STOP# signal, indicating that the target is performing a long latency read and wishes to release the PCI bus 24 for non-exclusive accesses in the interim. The posting master detects the STOP# and POST# signals asserted at a time T94 at the beginning of the second CLK cycle. Subsequently, at a time T96 during the second CLK cycle, the posting master negates the FRAME# signal in response to the STOP# signal, and also asserts the LOCK# signal in response to the POST# signal being asserted. However, since the IRDY# signal is asserted at time T96 while the TRDY# and STOP# signals are also asserted, one last data transfer occurs before the cycle is completed. The transaction ends at a time T99 when the IRDY# signal is negated by the master and the TRDY#, STOP#, DEVSEL# and POST# signals are negated by the posting device. The posting master then gets off the PCI bus 24 and arbitrates it to other masters to allow them to perform non-exclusive accesses in the interim while the target is retrieving the data for the posted read.

Referring now to FIG. 4B, a posted read is indicated where no data transfer occurs, illustrating a retry transaction. In this case, the FRAME# signal is asserted during the cycle at a time T100, although the TRDY# signal remains negated. The target asserts the STOP# and the LOCK# signals at time T102 to indicate a posted read, which is detected by the posting master at a time T104. In this example, the negation of the FRAME# signal is delayed until a time T110, which is when the IRDY# signal could be asserted by the master. Also, the LOCK# signal is asserted at a time T110 to lock the target. At a time T112, the target detects the FRAME# signal negated and subsequently negates the STOP#, DEVSEL# and POST# signals at a time T114. The master also negates the IRDY# signal at time T114 and the cycle ends. Again, since the read is posted by the target, the posting master rearbitrates the PCI bus 24 for access by other masters for non-exclusive accesses. Meanwhile, the target continues its access to retrieve the data requested by the posting master. Subsequently, the posting master gains control of the PCI bus 24 and retrieves its data, as shown in FIG. 3C.

While a long latency read is posted, the PCI bus 24 is locked so that only non-exclusive accesses are allowed. Targets other than the one locked and performing the posted read are allowed to be non-exclusively accessed by any new bus master that gets on the PCI bus 24. However, no reads may be posted while the PCI bus 24 is locked. Other masters might be allowed to queue posted writes to the locked target if that particular target can handle it. Otherwise, the locked target activates the STOP# signal to cause the master to retry its access at a later time. Any reads to a locked target are forced to be retried at a later time. The main memory controller 25 is the natural focus of most non-CPU PCI masters, so that it should receive the bulk of the non-exclusive accesses during the posted read interim period.

Further, the posting device continually monitors the LOCK# signal and the FRAME# signal to determine whether the posting master is still interested in the data. If ever the LOCK# signal is negated while the FRAME# signal is negated and a target is performing a posted read, the posted read is aborted. This indicates that the posting master has lost interest, or perhaps that the CPU subsystem 20 has been backed off and its retry sequence does not match.

One particular problem is how a CPU subsystem 20 would be able to snoop a PCI master to main memory 25 access while the CPU is in an active cycle waiting for its posted read to be serviced. A first solution is that the CPU subsystem 20 must be backed off to allow snoops to be checked by the CPU's L2 cache 23. The back off of the CPU subsystem 20 is not fatal for the PCI bridge 22, but it would have to hold off retrying the PCI cycle until the CPU subsystem 20 had retried the pending cycle. If the retried CPU access does not match up with the data to be returned by the PCI retry cycle, then the PCI bridge 22 must deactivate the LOCK# signal and abort the posted read cycle.

Another potential solution is that the CPU subsystem 20 would not have to snoop the master to memory 25 accesses because a software device driver would enforce coherency, making sure that the L2 cache 23 does not have any contents that matched what the PCI masters would access. This is valid as long as there are not multiple CPUs on a single PCI bus 24, and if the PCI non-CPU masters have a memory access pattern that is predictable.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A computer system, comprising:

a peripheral component interconnect bus including a lock signal, a stop signal and a post signal, said peripheral component interconnect bus for performing read and posted read cycles;

a posting target coupled to said peripheral component interconnect bus, comprising:
    means for detecting a read cycle on said peripheral component interconnect bus accessing said posting target;
    means coupled to said detecting means and said peripheral component interconnect bus for asserting said stop and post signals to convert said read cycle to a posted read cycle;
    means coupled to said peripheral component interconnect bus for retrieving data requested during said posted read cycle and for providing the data on said peripheral component interconnect bus; and
    means for monitoring said lock signal,
    wherein if said lock signal is asserted in response to said assertion of said post signal during said posted read cycle, and if said lock signal is negated and reasserted during a subsequent read cycle, said retrieving and providing means asserts the retrieved data on said peripheral component interconnect bus; and a posting master coupled to said peripheral component interconnect bus; comprising:
    means for executing read cycles on said peripheral component interconnect bus; and
    means coupled to said peripheral component interconnect bus for detecting the assertion of said stop and post signals during a read cycle and for asserting said lock signal, wherein if said stop and post signals indicate said posted read cycle, said posting master asserts said lock signal and releases said peripheral component interconnect bus, and wherein said posting master subsequently executes said subsequent read cycle during which said posting master negates and then reasserts said lock signal and retrieves the data from said peripheral component interconnect bus.

2. The computer system of claim 1, wherein said posting target further comprises:

a buffer for holding data; and posting logic coupled to said buffer, wherein if the data requested by said posting master is in said buffer during a read cycle, said posting target provides the data on said peripheral component interconnect bus and does not assert said stop and post signals.

3. The computer system of claim 1, wherein said posting target further comprises:

an address latch and comparator circuit, wherein said posting target latches an address provided on the peripheral component interconnect bus during a read cycle, and if said lock signal is not asserted in response to said posting target asserting said stop and post signals during said read cycle, said address latch and comparator circuit compares addresses asserted during subsequent read cycles on said peripheral component interconnect bus, and if a match occurs during a subsequent read cycle and said posting target has retrieved the requested data, said posting target provides said retrieved data on said peripheral component interconnect bus during said subsequent read cycle when said match occurred.

4. A method of performing posted read cycles in a computer system including a peripheral component interconnect bus, the peripheral component interconnect bus including a lock signal, a stop signal and a sideband post signal, the computer system further including at least one peripheral component interconnect bus master and at least one peripheral component interconnect target coupled to the peripheral component interconnect bus, said method comprising the steps of:

a master executing a first read cycle on the peripheral component interconnect bus;

a target decoding the read cycle and asserting the stop and post signals to post the read cycle, and then retrieving the data requested by the master during the read cycle;

the master asserting the lock signal to lock the target if the post and stop signals are asserted during the first read cycle;

the master releasing the peripheral component interconnect bus in response to the read cycle being posted;

the master subsequently re-gaining control of the peripheral component interconnect bus and executing a second read cycle;

the master negating and reasserting the lock signal during the second read cycle; and the target monitoring the lock signal after posting the first read cycle, and providing the retrieved data on the peripheral component interconnect bus during the second read cycle if the lock signal is negated and reasserted.

5. The method of claim 4, wherein the target further includes buffers and posting logic, further comprising the steps of:

during said decoding step, the posting logic determining if the buffer holds the requested data; and if the buffer holds the requested data, providing the data on the peripheral component interconnect bus after said decoding step and preventing the assertion of the stop and post signals.

6. The method of claim 4, further comprising the steps of:

the target further monitoring the lock signal after said step of asserting the stop and post signals;

latching an address provided during the first read cycle;

the target comparing addresses provided on the peripheral component interconnect bus with the latched address during subsequent read cycles if the lock signal is not asserted in response to the posting of the first read cycle, and providing the data on the peripheral component interconnect bus if a match occurs and if the target has retrieved the requested data.

* * * * *